UNITED STATES PATENT OFFICE.

ALBERT KLAPPERSTÜCK, OF HOBOKEN, NEW JERSEY, ASSIGNOR OF ONE-HALF TO ANTON H. MEYER, OF SAME PLACE.

FIRE-PROOF COMPOUND FOR CEILINGS, &c.

SPECIFICATION forming part of Letters Patent No. 418,192, dated December 31, 1889.

Application filed July 27, 1889. Serial No. 318,935. (No specimens.)

*To all whom it may concern:*

Be it known that I, ALBERT KLAPPERSTÜCK, of Hoboken, Hudson county, New Jersey, have invented an Improved Fire-Proof Compound for Ceilings and Walls, of which the following is a specification.

This invention relates to an improved wall or ceiling, which can be made very thin, is fire and water proof, sets quickly, and is composed of but a single coating of prepared mortar applied to a suitable backing.

In producing my improved ceiling or wall I first mix about eighty parts of mortar with seventeen parts of calcined gypsum, plaster-of-paris, and preferably with about two parts of hair. I also mix separately about one-half a part of colophonium with one-half a part of an acid, preferably muriatic acid, and a suitable quantity of water. The colophonium will be carried by the diluted acid in small particles and will not have a tendency to form lumps and settle in collected masses on the bottom. The mixture of colophonium and diluted acid are next mixed with the mortar, gypsum, and hair to produce my improved plaster.

This plaster is thrown against a suitable fire-proof backing, preferably a coarse-meshed wire-netting. It is applied to both sides and is smoothed off in the usual manner. After having been allowed to dry or set for about two hours, the wall is in condition to be papered or painted.

In my improved mixture the colophonium remains in a neutral condition within the wall until subjected to heat; but when a fire breaks out the colophonium will cause the wall to assume a glazed structure, which renders it incombustible. This structure the wall will thereafter maintain.

The walls may be made very light and thin. Besides being fire-proof, they are also water-proof, and are poor transmitters of sound. Of course I may make my walls in small transportable sections.

What I claim is—

A fire-proof compound for ceilings and walls, consisting of mortar, gypsum, colophonium, and an acid, substantially as specified.

ALBERT KLAPPERSTÜCK.

Witnesses:
 F. V. BRIESEN,
 A. H. MEYER.